Figures 1, 2, 3:
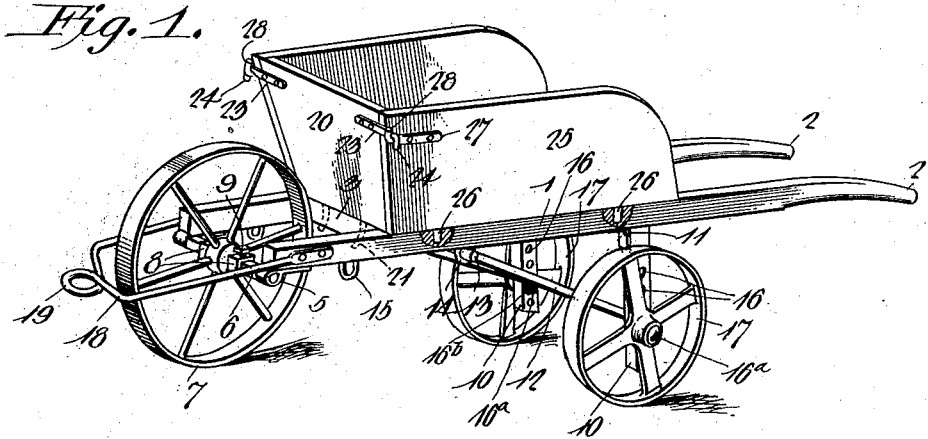

No. 717,471.  
B. TANNER.  
WHEELBARROW.  
(Application filed Oct. 30, 1901.)  
Patented Dec. 30, 1902.

(No Model.)

Witnesses  
B. Tanner, Inventor,  
by C. A. Snow & Co.  
Attorneys

UNITED STATES PATENT OFFICE.

BENJAMIN TANNER, OF STURGIS, MICHIGAN.

WHEELBARROW.

SPECIFICATION forming part of Letters Patent No. 717,471, dated December 30, 1902.

Application filed October 30, 1901. Serial No. 80,559. (No model.)

*To all whom it may concern:*

Be it known that I, BENJAMIN TANNER, a citizen of the United States, residing at Sturgis, in the county of St. Joseph and State of Michigan, have invented a new and useful Improvement in Wheelbarrows, of which the following is a specification.

My invention is an improved wheelbarrow; and it consists in the peculiar construction and combination of devices hereinafter fully set forth and claimed.

In the accompanying drawings, Figure 1 is a perspective view of a wheelbarrow embodying my improvements. Fig. 2 is a top plan view of the barrow, showing the same provided with cultivating-plows, whereby it may be used as a cultivator. Fig. 3 is a longitudinal sectional view of the same.

In the construction of my improved wheelbarrow I employ the usual frame, comprising the side bars 1, the rear ends of which form the handles 2, and the cross-bars 3 and 4, which connect the said side bars, as shown in Fig. 2. At the front ends of the side bars are bearings 5, in which are journaled spindles at the ends of an axle 6. The said axle is preferably angular in cross-section, and on the same is mounted the wheel 7. Said wheel is adapted to be adjusted on the said axle, so as to be disposed either in the center or near either end thereof, and I provide a pair of collars or sleeves 8, which fit and are adjustable on the said axle and are provided with set-screws 9, by means of which they may be secured to the axle at any desired adjustment, said collars or sleeves, as will be understood, serving to secure the said wheel to the axle when adjusted.

Under the side bars 1, near the rear ends thereof, are supporting-legs 10, which are hinged at their upper ends to the side bars by means of hinges 11 or other suitable devices, whereby the said supporting-legs are adapted to be folded forwardly to lie under the said side bars, as shown in Fig. 3. To the said supporting-legs are pivotally connected links 12, the front ends of which are provided with hooks 13, adapted to engage keepers 14 15, which depend from the lower sides of the side bars 1 at suitable distances apart. When the legs 10 are in their approximately vertical positions, as shown in Fig. 1, the said links 12, which brace the said legs, are hooked into the keepers 14; but when the said legs are folded under the side bars 1 the said links 12 are hooked into the keepers 15, as shown in Fig. 3. Each of the said legs 10 is provided with a plurality of openings 16 to be engaged by spindles $16^a$, carried by wheels 17, the diameter of the wheels to be such that when the legs 10 support the rear end of the wheelbarrow the said wheels are out of contact with the ground, or, in other words, the radii of the wheels are to be less than the length of the legs; but when the legs 10 are folded under the wheelbarrow the said wheels operate to support the rear end of the structure when the same is employed as a cultivator, as shown in Fig. 3. Each of the legs is provided with a plurality of openings $17^a$ to be engaged by the spindles $16^a$, thereby to permit of the wheels being adjusted upon the legs, thus to raise the handles 2 the desired distance above the ground to render the structure easy of propulsion over the ground and also to suit the height of the operator. To hold the spindles rigidly secured with relation to the legs, nuts $16^b$ are screwed onto the inner ends of the spindles and bear against the legs.

At the front end of the wheelbarrow is a substantially U-shaped fender 18, the arms of which extend rearwardly and are bolted on the front ends of the side bars 1. The said fender, as shown in the drawings, extends in front of the wheel 7, and the shape of the said fender is such as to enable said wheel 7 to be adjusted laterally on the axle 6, as indicated by dotted lines in Fig. 2. A ring 19 is formed in the central portion of the said fender, whereby the latter is adapted to be used for draft purposes when an animal is harnessed in front of the wheelbarrow to draw the same when used as a cultivator, vegetable-top cutter, or seeder, as hereinafter described.

The end-board 20 of the wheelbarrow is provided on its lower side with forwardly-curved or inclined studs 21, (shown in dotted lines in Fig. 1,) which studs are adapted to enter correspondingly-shaped openings 22 in the cross-bar 3 to secure the said end-board on said cross-bar. On the front side of the said end-board, near the upper edge thereof, are hooks 23, which project beyond the sides of the end-board and the outer ends of which are downturned, as at 24.

The side-boards 25 of the wheelbarrow are provided on their lower sides with projecting studs 26, which are adapted to enter openings in the upper sides of the side bars 1 and the front ends of the said side-boards overlap and bear against the side edges of the end-board 20. The said side-boards are provided with hooks 27 on their outer sides at their front ends, the front outer ends of which hooks are upturned, as at 28, and the said hooks 27 are adapted to engage the hooks 23 of the end-board on the under sides of said hooks 23 to lock the front ends of said side-boards to the ends of the end-board 20. Since the latter when thus locked to the side-boards is prevented by the curved or inclined studs 21 from being displaced vertically, said side-boards 25, which are interlocked with said end-board, are also firmly secured on the barrow. It is obvious that the side-boards may be readily removed by first raising the rear ends thereof to disengage their studs 26 from the side bars 1 and their hooks 27 from the hooks 23, and that thereafter said end-board 20 may be readily disengaged from the cross-bar 3 of the wheelbarrow frame. Said cross-bar 3 is provided at suitable distances apart on its rear side with vertical recesses 29, in which are adapted to be fitted the upper ends of standards 30, which are provided with cultivating-shovels 31 of suitable shape and size. Preferably the said standards are octagonal in cross-section. Thereby they are adapted to be readily adjusted in said notches 29, either to dispose the cultivating-shovels parallel with the line of draft or obliquely with relation thereto, as may be desired. On the rear side of the cross-bar 3 is a lock-bar 32, which is fast to the cross-bar 3 at one end, as at 33, and the said lock-bar is connected by an adjusting-bolt 34 at its opposite end to the said cross-bar 3. The said lock-bar bears against the rear sides of the standards, at or near the upper ends thereof, and in coaction with the notched or recessed cross-bar 3 secures the said standards firmly in place, while admitting of the vertical adjustment thereof, to enable the cultivating-plows to be operated at any desired depth in the soil. By using a suitable number of the cultivating-plows and by appropriately adjusting the wheel 7 on the axle 6 the machine may be employed for operating as a cultivator on either one or both sides of a row of plants, as may be desired.

Having thus described my invention, I claim.

1. A wheelbarrow having a wheel at its front, standards at its sides having their upper ends hinged thereto and thereby adapted to be folded under the wheelbarrow, braces and means to adjustably connect them to the wheelbarrow and to the said standards, and rear supporting-wheels carried by and adjustable on said folding standards, substantially as described.

2. A wheelbarrow having a front board provided with forwardly-extending depending studs 21, the frame of the wheelbarrow having corresponding openings to receive said studs, side-boards having means to secure them to the sides of the wheelbarrow-frame, and interlocking hooks on said side and front end-boards to connect the front ends of said side-boards to the sides of said front end-board, the hooks on the end-board overriding those on the side-boards, substantially as described.

3. A wheelbarrow having a frame including side bars and a cross-bar, bearings at the front ends of the side bars, a shaft in said bearings, a wheel shiftable laterally on said shaft, and a fender directly in advance of the wheel, and in which the latter is shiftable, said fender having a ring 19, at its center and rearwardly-extending arms secured to the side bars of the frame, substantially as described.

In testimony that I claim the foregoing as my own I have hereto affixed my signature in the presence of two witnesses.

BENJAMIN TANNER.

Witnesses:
 H. W. HAGERMAN,
 MARTIN J. PECK.